United States Patent Office 3,051,743
Patented Aug. 28, 1962

3,051,743
VINYL 4,4,4-TRINITROBUTYRATE
Irwin J. Schaffner, Waldwick, N.J., assignor to United States Rubber Company, New York, N.Y., a corporation of New Jersey
No Drawing. Filed June 26, 1951, Ser. No. 233,705
1 Claim. (Cl. 260—478)

This invention relates to a new compound, vinyl 4,4,4-trinitrobutyrate. This new compound is useful as an explosive and/or propellant. It is also a monomer which can be polymerized or copolymerized to form useful plastic materials, some of which are useful in the compounding of propellant mixtures, e.g., as propellant plasticizers.

The said new compound is made by reacting 4,4,4-trinitrobutyric acid with a vinyl ester, e.g., vinyl acetate, in the presence of a catalyst which promotes acid interchange and an inhibitor of polymerization. A typical catalyst is a mercuric salt, e.g., mercuric sulfate. It may be added to the reaction mixture as such or it may be formed in situ. I prefer to use the latter method because the mercuric sulfate so formed is usually somewhat more active than that formed externally. Typical inhibitors of polymerization are the copper salts which are soluble in the vinyl ester, e.g., copper resinate and copper naphthenate. When the reaction has approached equilibrium to the desired extent the catalyst is destroyed by adding a material, e.g., sodium or potassium acetate, which reacts with the sulfate ion to form a sulfate salt insoluble in the reaction mixture and which leaves in the solution a mercuric salt which is inactive as an interchange catalyst. The thus "frozen" mixture is then fractionally distilled in vacuo to isolate the new vinyl 4,4,4-trinitrobutyrate.

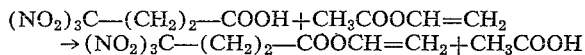

$(NO_2)_3C-(CH_2)_2-COOH+CH_3COOCH=CH_2$
$\rightarrow (NO_2)_3C-(CH_2)_2-COOCH=CH_2+CH_3COOH$ 4,4,4-trinitrobutyric acid can be made by addition of trinitromethane to acrylic acid or by addition of trinitromethane to acrylamide followed by hydrolysis of the 4,4,4-trinitrobutyramide so formed.

The following example discloses a method of making my new compound.

*Example*

A solution of 15.1 g. of trinitromethane in 25 ml. of methanol is added dropwise with shaking to a solution of 7.1 g. of acrylamide in 25 ml. of methanol at a temperature of 35–40° C. The solution is then boiled under reflux for about 5 minutes, and the methanol is evaporated in vacuo. To the crude 4,4,4-trinitrobutyramide (22.0 g.) is added a mixture of 25 ml. of water and 25 ml. of concentrated hydrochloric acid, and the mixture is boiled under reflux for 3.5 hours. The lower oily layer which solidified on cooling is separated by filtration. The crude acid is recrystallized from a mixture of chloroform and Skellysolve B (a petroleum fraction boiling at about 60–71° C. and having a high proportion of n-hexane) to yield 15.7 g. of 4,4,4-trinitrobutyric acid melting at 62–63° C.

The following reagents are mixed in the order shown: 13.38 g. of 4,4,4-trinitrobutyric acid, 41.3 g. of freshly distilled vinyl acetate, 0.1 g. of copper resinate, 0.6 g. of mercuric acetate and 0.128 g. of concd. sulfuric acid (d. 1.84). The solution is left at room temperature for 166 hours. The catalyst is destroyed by adding 0.25 g. of sodium acetate, an additional 0.1 g. of copper resinate is introduced, and the solution is fractionally distilled in vacuo. A fraction boiling at 95–105° at 0.8–1.2 mm. Hg contains most of the new ester in crude form. The residue from this distillation is extracted with dry ether, the ether extract being added to the said ester fraction. A little copper resinate is added, and the solution fractionally distilled again, giving 6.0 g. of vinyl 4,4,4-trinitrobutyrate, B.P. 89° C. at 0.45 mm. Hg, $N_D^{20}$ 1.4724. It detonates on being struck by a hammer. It polymerizes on standing at room temperature to form a viscous oil which is useful as a propellant plasticizer.

*Analysis.*—Calcd. for $C_6H_7N_3O_8$: C, 28.92%; H, 2.83%; N, 16.86%. Found: C, 28.71%; H, 2.83%; N, 16.58%.

I claim:
Vinyl 4,4,4-trinitrobutyrate.

References Cited in the file of this patent

UNITED STATES PATENTS 2,467,234     Sargent et al.            Apr. 12, 1949